United States Patent [19]

Wine

[11] Patent Number: 4,532,540
[45] Date of Patent: Jul. 30, 1985

[54] TELETEXT SET-TOP CONVERTER WITH TRANSPARENT MODE

[75] Inventor: Charles M. Wine, Princeton, N.J.

[73] Assignee: RCA Corporation, Princeton, N.J.

[21] Appl. No.: 479,450

[22] Filed: Mar. 28, 1983

[51] Int. Cl.³ ............................................. H04N 9/32
[52] U.S. Cl. ................................... 358/12; 358/21 R
[58] Field of Search ................................ 358/12, 21 R

[56] References Cited

U.S. PATENT DOCUMENTS 4,288,809  9/1981  Yabe ..................................... 358/12
4,346,407  8/1982  Baer et al. .
4,388,639  7/1983  Cox et al. .

OTHER PUBLICATIONS

Set-Top Adapter Considerations for Teletext, IEEE Transaction on Consumer Electronics, vol. CE-25, No. 3, pp. 393-398.
Service Notes for Sears Model 5430 Telecaption Decoder.

Primary Examiner—Richard Murray
Attorney, Agent, or Firm—Eugene M. Whitacre; Joseph J. Laks; Sammy S. Henig

[57] ABSTRACT

A set-top teletext converter decodes the chroma burst signal of a color television signal with the substantially same amplitude and phase as the burst in the television signal. The teletext signal along with its transparent mode signal are decoded. The decoded teletext signal is then re-encoded as a standard television signal using the decoded burst signal. When switching between the encoded teletext signal and the regular television signal under the control of the transparent mode signal, no color shift is present.

11 Claims, 1 Drawing Figure

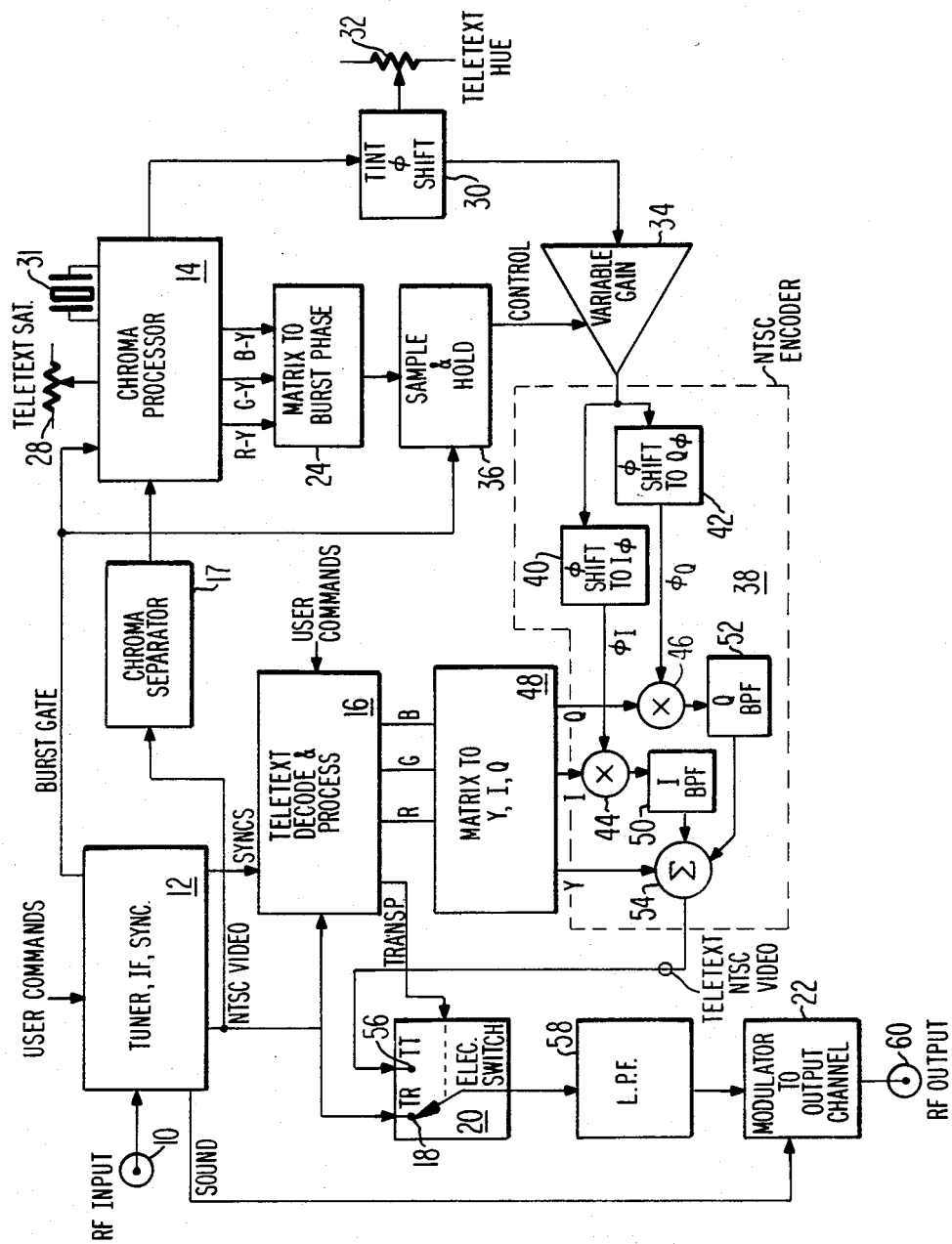

TELETEXT SET-TOP CONVERTER WITH TRANSPARENT MODE

BACKGROUND OF THE INVENTION

The present invention relates to a teletext converter which is external to a television receiver ("set-top" converter), and more particularly, to such converters having a "transparent mode".

Teletext is a service that broadcasts digital information within the vertical blanking interval (VBI) of a standard broadcast television signal and at the receiver presents the information as digitally generated text and/or pictures on a display screen. In the most commonly considered mode of operation, the standard TV picture is completely replaced by the digitally generated picture. "Transparent mode" refers to the situation in which some region of the screen, rather than being defined by the teletext signal, is occupied by the regular video signal. One example is a regular video picture having a teletext generated sub-title or caption. Ideally, the teletext converter, which converts the digital signals into video signals, is located within the receiver. However, almost all existing receivers do not have such an internal converter. Thus an external set-top converter is used if teletext signal reception is desired on most existing sets. A set-top converter receives the antenna signal, converts the digital teletext signal into a video signal, and then provides an output signal for connection to the receivers antenna input terminal.

One prior art method of producing a transparent mode set-top converter is to decode the regular video to baseband red, green and blue signals, combine these signals with R, G, and B signals derived from the decoded teletext, re-encode to composite NTSC, and then modulate with the composite NTSC signal an output carrier having a selected channel frequency. This approach suffers the deficiencies of high cost and significant signal quality degradation.

In particular, the decoding of composite video to baseband color signals, involving the separation of luminance and chrominance, band-limiting these signals and various other distortion producing processes degrades the fidelity of the standard TV picture produced after re-encoding and finally decoding again in the TV receiver.

It is therefore desirable to provide a set-top teletext decoder with transparent mode that does not cause signal degradation and has accurate color fidelity.

SUMMARY OF THE INVENTION

Method and apparatus for use with a color television signal having teletext information, comprising decoding the color subcarrier signal as a continuous signal with a selected amplitude and phase, converting said teletext signal into a video signal, encoding said video signal into a standard signal using said continuous signal, and selecting between said color television signal and said standard signal in accordance with a control signal.

DESCRIPTION OF THE DRAWING

The sole FIGURE is a block diagram of the invention.

DETAILED DESCRIPTION

Input terminal 10 receives from, e.g. a transmission line (not shown) coupled to an antenna (not shown), an RF television signal which comprises a digital teletext signal transmitted during the VBI. The television signal is applied to a circuit 12 comprising a tuner, IF circuit, detectors, and sync and burst separators, all as known in the art. Circuit 12 also receives a user command, i.e. channel selection, and provides as output signals a burst gate to chroma processor 14 and S and H (sample-and-hold) circuit 36, horizontal and vertical sync to teletext decoder 16, composite NTSC video including the teletext signal to decoder 16, chroma separator 17, and contact 18 of switch 20, and sound to modulator 22. Chroma separator 17 can comprise a conventional bandpass filter or comb filter and supplies I and Q signals modulated on a 3.58 MHz subcarrier and chroma burst to processor 14.

Processor 14 is a conventional color decoding circuit. It receives the I, Q, and burst signal from separator 17, and burst gate signal from tuner 12 and provides baseband R-Y, G-Y, and B-Y signals to matrix 24. The magnitude of these color difference signals is controlled by the saturation control 28 associated with processor 14 and it thus comprises the teletext saturation control. Another signal provided by processor 14 is a constant amplitude 3.58 MHz color subcarrier signal having the same phase as the input color burst and which is applied to phase shifter 30. The subcarrier can be generated by a phase-locked-loop (not shown) within processor 14 or by having the burst ring a crystal 31. The phase shift of shifter 30 is controlled by teletext hue control potentiometer 32, and therefore the phase of the subcarrier signal from processor 14 need not exactly match that of the input color burst. The subcarrier signal from shifter 30 is applied to variable gain amplifier 34.

Matrix 24 matrixes the R-Y, G-Y, and B-Y signals together so that during the occurrence of burst, an output pulse is provided by matrix 24 which has an amplitude proportional to the color burst of the video signal. This pulse is sampled by S and H circuit 36 under the control of the burst gate since the output signal of matrix 24 at times other than the burst occurence is of no interest. The output level signal from S and H circuit 36 is applied as a gain control signal to amplifier 34 so that the amplitude of the output signal from amplifier 34 is proportional to that of the received burst.

It will thus be appreciated that the output signal of amplifier 34 is an essentially constant amplitude color subcarrier whose phase is essentially the same as that of the burst of the video signal. Fine control of this subcarrier's amplitude and phase is respectively provided by potentiometers 28 and 32. Since as explained below, this subcarrier is used to convey the decoded teletext signal, potentiometers 28 and 32 respectively control the saturation and hue of the teletext signal relative to the regular video signal. Potentiometer 32 also allows compensation for phase shifts in ensuing filters. This subcarrier signal is applied to a standard NTSC encoder 38, in particular, to ±45 degree phase shifters 40 and 42 therein. The outputs of phase shifters 40 and 42 are respectively applied to multiplier-type modulators 44 and 46.

As known in the art, teletext decoder and processor 16, using a user supplied page select signal, decodes the digital teletext signal into a transparent mode signal for control of switch 20. In addition, decoder 16 decodes the digital teletext signals into R, G, and B output signals and applies the output signals to matrix 48. Teletext decoders are shown in the publication "Viditexas" published by Texas Instruments-France. Matrix 48 matrixes the R, G, and B signals into Y, I, and Q signals. Obviously, if decoder 16 directly provides Y, I and Q signals, matrix 48 can be eliminated. The I and Q signals are respectively applied to modulators 44 and 46. The modulated color subcarrier output signals from modulators 44 and 46 are respectively applied to BPFs (band pass filters) 50 and 52. BPF 50 passes frequencies from about 2 MHz to 4 MHz, while BPF 52 passes frequencies from about 3 MHz to 4 MHz. The output signals from BPFs 50 and 52 are applied to adder 54 along with the Y signal from matrix 48. The output signal from adder 54, which is also the output signal from encoder 38, is thus an NTSC encoded teletext signal having a color subcarrier with the same amplitude and phase (saturation and hue respectively) as that of the NTSC video signal from circuit 12, except for the possible fine adjustments provided by potentiometers 28 and 32. This encoded signal is applied to contact 56 of switch 20.

The transparent signal from decoder 16 controls the position of switch 20 so that the composite video from circuit 12 is applied to LPF (low pass filter) 58 when the transparent mode is used. When the non-transparent mode is in use, the teletext composite video from encoder 38 is applied to LPF 58. LPF 58 has a cutoff frequency of about 4.2 MHz so that high-frequency transients in the teletext signal do not disturb the sound signal. The output signal from LPF 58 is applied to modulator 22 along with the sound signal from circuit 12. Modulator 22 has an R.F. signal (usually channels 3 or 4) that is modulated by the two input signals and provides the modulated signal to output terminal 60 which terminal is connected to the television set antenna terminals.

What is claimed is:

1. Apparatus for use with a composite color television signal that contains a color burst signal, a teletext video signal, and a color encoded signal containing color picture information that is encoded with a color subcarrier signal having a first constant phase relationship with said color burst signal using a given color phase encoding rule, said apparatus comprising:

decoding means for decoding said color burst signal from said composite color television signal to produce a first signal therefrom that has a second constant phase relationship with said color subcarrier signal;

converting means for converting said teletext video signal from said composite color television signal into a teletext component signal that is capable of containing color information;

encoding means responsive to said first signal for encoding the color information of said teletext component signal into a second encoded television signal, wherein the color information of said teletext component signal is encoded in said second encoded television signal with said first signal using said given color phase encoding rule; and selecting means for selecting between said composite color television signal and said second encoded television signal.

2. Apparatus as claimed in claim 1 further comprising means for generating a burst gate signal from said composite color television signal, wherein said decoding means comprises a chroma processor having input means for receiving said color encoded signal and color burst signals of said composite color television signal, and said burst gate signal, first output means for providing baseband color signals, and a second output means for providing a constant amplitude color burst signal having the phase of said burst signal of said composite color television signal; a matrix coupled to said first output means; a sample-and-hold circuit having a signal input coupled to said matrix, a sampling input means for receiving said burst gate signal, and an output; and an amplifier having a signal input coupled to said second output means, a gain control input coupled to said sample-and-hold circuit output, and an output coupled to said encoding means.

3. Apparatus as claimed in claim 1, wherein said first signal has selected amplitude and phase that are selected so that said second encoded television signal and said composite color television signal have substantially the same color subcarrier signals, respectively, at said selecting means.

4. Apparatus as claimed in claim 1 further comprising means for generating a control signal from said teletext video signal for controlling in accordance therewith the signal that is selected by said selecting means, wherein said control signal comprises a transparent mode signal.

5. Apparatus for use with an R.F. color television signal having a digital teletext signal, said apparatus comprising a tuner having an input for receiving said R.F. television signal, a first output for providing a burst gate signal, a second output providing sync signals, a third output providing a composite color signal including said digital teletext signals, and a fourth output providing the sound signal of said television signal;

a chroma separator coupled to said third output;

a chroma processor coupled to said first output and to said separator, and providing a constant amplitude burst signal having the phase of the burst of said color television signal and also providing baseband color signals;

a matrix coupled to said processor;

a sample-and-hold circuit having a signal input coupled to said matrix and a sampling input coupled to said first output;

a variable gain amplifier having a gain control input coupled to said sample-and-hold circuit and a signal input coupled to said processor to receive said constant amplitude burst signal;

a composite encoder coupled to said variable gain amplifier;

a teletext decoder having inputs respectively coupled to said second and third outputs, and having outputs for respectively providing a transparent mode signal and baseband color signals to said encoder representing said teletext signal;

a switch having a pair of signal inputs respectively coupled to said third output and to said encoder, a control input coupled to said decoder to receive said transparent mode signal; and a modulator coupled to said switch and to said fourth output.

6. Apparatus as claimed in claim 5, further comprising a matrix coupled between said decoder and encoder.

7. Apparatus as claimed in claim 5, further comprising a low pass filter coupled between said switch and said modulator.

8. Apparatus as claimed in claim 5, further comprising a burst amplitude control coupled to said processor.

9. Apparatus as claimed in claim 5, further comprising a controllable phase shifter coupled between said processor and said variable gain amplifier.

10. Apparatus for generating a composite color television signal modulated onto a radio-frequency carrier from an incoming composite color television signal including teletext information, said apparatus comprising:

a teletext decoder coupled to receive said incoming composite color television signal for generating baseband video components representative of said teletext information and for further generating a control signal indicative of those intervals during which teletext information is to be displayed;

a composite color signal generator coupled to said teletext decoder for generating a composite color teletext signal from said baseband video components representative of said teletext information;

controllable switch means having first and second input ports and a common output port, and having a control input coupled to said teletext decoder for receiving said control signal therefrom for controlling the position of said switch between said first and second input ports;

first coupling means for coupling to said first port of said switch said composite color teletext signal;

second coupling means for coupling to said second port of said switch means said incoming composite color television signal;

a radio-frequency modulator; and third coupling means coupled to said common output port and to said radio-frequency modulator for applying composite color television signal from said common output to said radio-frequency modulator for modulation onto a carrier;

wherein the improvement lies in that said composite color signal generator includes a color subcarrier generator means, responsive to said incoming composite color television signal for generating a color subcarrier signal for use by said generator, said color subcarrier having an amplitude and phase substantially equal to the amplitude and phase of the color subcarrier burst component of said incoming composite color television signal, whereby the position of said controllable switch means can be switched at intervals corresponding to a fraction of a line scan interval without the introduction of undesirable color shifts between said incoming and teletext composite color television signals.

11. Apparatus according to claim 10 wherein said source of incoming composite color television signal comprises a radio-frequency tuner and a detector.

* * * * *